United States Patent
Choi et al.

(10) Patent No.: US 12,312,463 B2
(45) Date of Patent: May 27, 2025

(54) THERMOPLASTIC RESIN COMPOSITION HAVING IMPROVED BLACKNESS AND SCRATCH RESISTANCE, AND MOLDED ARTICLE COMPRISING THE SAME

(71) Applicants: HYUNDAI MOTOR COMPANY, Seoul (KR); KIA CORPORATION, Seoul (KR); LG CHEM, LTD., Seoul (KR)

(72) Inventors: Min Jin Choi, Bucheon-si (KR); Choon Ho Lee, Hwaseong-si (KR); Jin Sol Park, Daejeon (KR); Myeung Il Kim, Daejeon (KR)

(73) Assignees: HYUNDAI MOTOR COMPANY, Seoul (KR); KIA CORPORATION, Seoul (KR); LG CHEM, LTD., Seoul (KR)

( * ) Notice: Subject to any disclaimer, the term of this patent is extended or adjusted under 35 U.S.C. 154(b) by 0 days.

(21) Appl. No.: 17/994,889

(22) Filed: Nov. 28, 2022

(65) Prior Publication Data

US 2023/0167294 A1    Jun. 1, 2023

(30) Foreign Application Priority Data

Nov. 29, 2021    (KR) .................. 10-2021-0167356

(51) Int. Cl.
*C08L 33/12* (2006.01)
*C08F 212/08* (2006.01)
*C08F 220/18* (2006.01)
*C08F 279/04* (2006.01)

(52) U.S. Cl.
CPC ............ *C08L 33/12* (2013.01); *C08F 212/08* (2013.01); *C08F 220/1804* (2020.02); *C08F 279/04* (2013.01); *C08L 2201/10* (2013.01); *C08L 2205/03* (2013.01)

(58) Field of Classification Search
CPC .. C08L 33/12; C08F 220/1804; C08F 212/08; C08F 279/04; C08F 2201/10; C08F 2205/03
See application file for complete search history.

(56) References Cited

U.S. PATENT DOCUMENTS

| | | | |
|---|---|---|---|
| 2009/0118402 A1 | 5/2009 | Jang et al. | |
| 2013/0131258 A1* | 5/2013 | Kwon | C08L 33/062 526/278 |
| 2017/0320982 A1* | 11/2017 | Baek | C08L 25/12 |
| 2021/0061984 A1* | 3/2021 | Shin | C08L 33/12 |

FOREIGN PATENT DOCUMENTS

| | | | |
|---|---|---|---|
| KR | 100655821 B1 * | 12/2006 | ............ C08L 51/04 |
| KR | 100920807 B1 * | 10/2009 | ............ C08L 33/06 |
| KR | 2016-0144944 A | 12/2016 | |
| KR | 10-1712419 B1 | 3/2017 | |
| KR | 2021-0101824 A | 8/2021 | |
| WO | 2015/152468 A1 | 10/2015 | |

OTHER PUBLICATIONS

De Gennes, P.-G., Scaling Concepts in Polymer Physics (Year: 1979).*
Sang Jin Jang, et al., "Optical and Mechanical Properties of Styrene/Butyl Acrylate/Methyl Methacrylate Terpolymers," Polymer(Korea), vol. 39, No. 2, pp. 191-199 (2015).

* cited by examiner

Primary Examiner — Irina Krylova
(74) Attorney, Agent, or Firm — MCDONNELL BOEHNEN HULBERT & BERGHOFF LLP

(57) ABSTRACT

A thermoplastic resin composition contains a styrene-methyl methacrylate-butyl acrylate copolymer and thus exhibits improved blackness and scratch resistance, and a molded article including the same.

8 Claims, No Drawings

THERMOPLASTIC RESIN COMPOSITION HAVING IMPROVED BLACKNESS AND SCRATCH RESISTANCE, AND MOLDED ARTICLE COMPRISING THE SAME

CROSS REFERENCE TO RELATED APPLICATIONS

This application claims under 35 U.S.C. § 119(a) the benefit of priority to Korean Patent Application No. 10-2021-0167356, filed on Nov. 29, 2021, the entire contents of which are incorporated herein by reference.

BACKGROUND

(a) Technical Field

The present disclosure relates to a thermoplastic resin composition, and more particularly, to a thermoplastic resin composition that contains a styrene-methyl methacrylate-butyl acrylate copolymer and thus exhibits improved blackness and scratch resistance, and a molded article including the same.

(b) Background Art

A polymethyl methacrylate (PMMA) resin is a synthetic resin using methyl methacrylate monomer as a main raw material, and is a plastic having excellent transparency and excellent scratch resistance due to the high surface hardness thereof. In addition, a polymethyl methacrylate resin is widely used as a material for automobiles and electrical and electronic parts due to the excellent weather resistance, chemical resistance, surface gloss and adhesivity thereof.

In the prior art, as a modification method for improving impact resistance while maintaining the weather resistance, colorability, gloss, and scratch resistance of polymethyl methacrylate resin, an acrylonitrile-styrene-acrylate (ASA) copolymer has been applied to the polymethyl methacrylate resin.

Molded articles using a modified polymethyl methacrylate resin are suitable for exterior automotive parts such as radiator grilles, side mirror housings, and garnishes, and do not require a coating process to impart appearance characteristics thereto, thus having a great advantage of reducing costs, unlike ABS (acrylonitrile-butadiene-styrene) copolymers and ASA.

Therefore, against the above background, the development of a thermoplastic resin composition having excellent blackness and scratch resistance, which is suitable for use without coating, continues.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a thermoplastic resin composition having improved blackness and scratch resistance, and a molded article including the same.

The objects of the present disclosure are not limited to those described above. Other objects of the present disclosure will be clearly understood from the following description, and are able to be implemented by means defined in the claims and combinations thereof.

In one aspect, the present disclosure provides a thermoplastic resin composition containing 60% by weight to 65% by weight of a polymethyl methacrylate resin, 15% by weight to 20% by weight of an acrylic copolymer, and 15% by weight to 20% by weight of a styrene-methyl methacrylate-butyl acrylate copolymer.

The polymethyl methacrylate resin may include one selected from the group consisting of a methyl methacrylate homopolymer, a methyl methacrylate-acrylate copolymer, and a combination thereof.

The acrylic copolymer may be a copolymer prepared by grafting 50% to 60% by weight of styrene-acrylonitrile into 40% to 50% by weight of an acrylic rubber.

The acrylic copolymer may have an average particle diameter of 100 to 300 nm.

The thermoplastic resin composition may further contain 1% to 5% by weight of an additive, wherein the additive includes at least one selected from the group consisting of heat stabilizers, lubricants, UV stabilizers, lubricants, antioxidants, light stabilizers, release agents, and combinations thereof.

The thermoplastic resin composition may have a brightness value ($L^*$), measured according to ASTM E308 using a specular component excluded (SCE) measurement mode, of 1.54 or less.

The thermoplastic resin composition may have a scratch resistance, measured according to the following method, of 94% or more.

A specimen is produced by injection-molding the resin composition at 200° C. to 230° C., and then maintenance of gloss at 60° is evaluated using an Erichsen gloss meter, both before and after forming a scrape on the specimen using a scraper at a load of 10N and a speed of 1,000 mm/min.

In another aspect, the present disclosure provides a molded article including the thermoplastic resin composition according to the present disclosure.

DETAILED DESCRIPTION

The objects described above, as well as other objects, features, and advantages, will be clearly understood from the following preferred embodiments with reference to the attached drawings. However, the present disclosure is not limited to the embodiments, and may be embodied in different forms. The embodiments are suggested only to offer a thorough and complete understanding of the disclosed context and to sufficiently inform those skilled in the art of the technical concept of the present disclosure.

It will be further understood that terms such as "comprise" or "has", when used in this specification, specify the presence of stated features, integers, steps, operations, elements, components, or combinations thereof, but do not preclude the presence or addition of one or more other features, integers, steps, operations, elements, components, or combinations thereof. In addition, it will be understood that, when an element such as a layer, film, region, or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures, and/or expressions that represent ingredients, reaction conditions, polymer compositions, and amounts of mixtures used in the specification are approximations that reflect various uncertainties of measurement occurring inherently in obtaining these figures, among other things. For this reason, it should be understood that, in all cases, the term "about" should be understood to modify all such numbers, figures and/or expressions. In addition, when numerical ranges are disclosed in the description, these ranges are continuous, and include all numbers from the minimum to the maximum, including the maximum within each range, unless otherwise defined. Furthermore, when the range refers to an integer, it includes all integers from the minimum to the maximum, including the maximum within the range, unless otherwise defined.

It should be understood that, in the specification, when a range is referred to regarding a parameter, the parameter encompasses all figures including end points disclosed within the range. For example, the range of "5 to 10" includes figures of 5, 6, 7, 8, 9, and 10, as well as arbitrary sub-ranges, such as ranges of 6 to 10, 7 to 10, 6 to 9, and 7 to 9, and any figures, such as 5.5, 6.5, 7.5, 5.5 to 8.5, and 6.5 to 9, between appropriate integers that fall within the range. In addition, for example, the range of "10% to 30%" encompasses all integers that include numbers such as 10%, 11%, 12%, and 13%, as well as 30%, and any sub-ranges, such as 10% to 15%, 12% to 18%, or 20% to 30%, as well as any numbers, such as 10.5%, 15.5%, and 25.5%, between appropriate integers that fall within the range.

The thermoplastic resin composition according to the present disclosure contains 60% by weight to 65% by weight of a polymethyl methacrylate resin, 15% by weight to 20% by weight of an acrylic copolymer, and 15% by weight to 20% by weight of a styrene-methyl methacrylate-butyl acrylate copolymer.

Specifically, the thermoplastic resin composition may further contain 1% by weight to 5% by weight of an additive.

Each component constituting the thermoplastic resin composition according to the present disclosure will be described in more detail below.

(A) Polymethyl Methacrylate Resin

The polymethyl methacrylate resin is used to impart mechanical properties and surface gloss to the thermoplastic resin composition.

The polymethyl methacrylate resin is present in an amount of 60% by weight to 65% by weight in the thermoplastic resin composition.

The polymethyl methacrylate resin may include one selected from the group consisting of a methyl methacrylate homopolymer, a methyl methacrylate-acrylate copolymer, and a combination thereof.

(B) Acrylic Copolymer

The acrylic copolymer is used to improve the impact resistance of the thermoplastic resin composition.

The acrylic copolymer is present in an amount of 15% by weight to 20% by weight in the thermoplastic resin composition. Here, when the content of the acrylic copolymer is less than 15% by weight, blackness may be improved, but the impact resistance is lowered. On the other hand, when the content of the acrylic copolymer is higher than 20% by weight, blackness and scratch resistance may be deteriorated.

The acrylic copolymer may have an average particle diameter of 100 to 300 nm. Here, the term "average particle diameter" means D50.

The acrylic copolymer may be a copolymer in which 50 to 60% by weight of styrene-acrylonitrile is grafted into 40 to 50% by weight of an acrylic rubber. Specifically, the acrylic copolymer is preferably an acrylonitrile-styrene-butyl acrylate copolymer.

(C) Styrene-Methyl Methacrylate-Butyl Acrylate Copolymer

The styrene-methyl methacrylate-butyl acrylate copolymer is used to improve the blackness and scratch resistance of the thermoplastic resin composition.

The styrene-methyl methacrylate-butyl acrylate copolymer is present in an amount of 15% by weight to 20% by weight in the thermoplastic resin composition. When the content of the styrene-methyl methacrylate-butyl acrylate copolymer is less than 15% by weight, there is a problem in that blackness and scratch resistance are deteriorated. On the other hand, when the content of the styrene-methyl methacrylate-butyl acrylate copolymer is higher than 20% by weight heat resistance is deteriorated.

(D) Additive

The additive may be selectively used as needed, as long as it does not impair the effects of the present disclosure, and the type and content thereof may be known in the art, and are not particularly limited.

The additive may be present in an amount of 1% by weight to 5% by weight in the thermoplastic resin composition.

The additive may include at least one selected from the group consisting of heat stabilizers, lubricants, UV stabilizers, lubricants, antioxidants, light stabilizers, release agents, and combinations thereof.

The thermoplastic resin composition may have a brightness value ($L^*$), measured according to ASTM E308 using a specular component excluded (SCE) measurement mode, of 1.54 or less.

The thermoplastic resin composition may have a scratch resistance, measured according to the following method, of 94% or more.

Method of Measuring Scratch Resistance

A specimen was produced by injection-molding the resin composition at 200° C. to 230° C., and then maintenance of gloss at 60° was evaluated using an Erichsen gloss meter, both before and after forming a scrape on the specimen using a scraper at a load of 10N and a speed of 1,000 mm/min.

In another aspect, the present disclosure provides a molded article including the thermoplastic resin composition according to the present disclosure. There is no limitation as to the fields to which the molded article is applicable, but the molded article may be particularly applicable to the field of automotive exterior materials.

Specifically, the molded article may be an automobile exterior material, such as a side mirror or a pillar garnish. The molded article may be used as an uncoated product due to the excellent scratch resistance as well as surface gloss and impact resistance thereof. The molded article can exhibit excellent blackness when added with a black pigment and then extruded.

For this reason, the molded article according to the present disclosure can be injected without coating to impart appearance characteristics thereto, which thus reduces costs.

Hereinafter, the present disclosure will be described in more detail with reference to specific examples. However, the following examples are provided only for better understanding of the present disclosure, and thus should not be construed as limiting the scope of the present disclosure.

Examples 1 to 3 and Comparative Examples 1 to 3

First, the compositions having the components and contents shown in Table 1 below were put into a twin-screw extruder along with a colorant and melt-extruded in a temperature range of 200 to 230° C.

Then, the pellets obtained by extrusion were dried at a temperature of 80° C. for 3 hours or more, and then specimens for measuring physical properties were produced in a temperature range of 200 to 230° C. using an Engel extruder (80 tons).

TABLE 1

| Composition (wt %) | Example 1 | Example 2 | Example 3 | Comparative Example 1 | Comparative Example 2 | Comparative Example 3 |
|---|---|---|---|---|---|---|
| PMMA | 60 | 62 | 64 | 60 | 60 | 60 |
| ASA | 19 | 17 | 15 | 38 | 28 | 15 |
| Styrene-methyl methacrylate-butyl acrylate | 19 | 19 | 19 | — | 10 | 23 |
| Additive | 2 | 2 | 2 | 2 | 2 | 2 |
| Total | 100 | 100 | 100 | 100 | 100 | 100 |

Composition ingredients
(1) PMMA—Polymethyl methacrylate, produced by LG MMA
(2) ASA—Acrylonitrile-styrene-acrylate copolymer having average particle diameter of 100 to 300 nm - Copolymer in which 50 to 60% by weight of styrene-acrylonitrile is grafted into 40 to 50% by weight of acrylic rubber
(3) Styrene-methyl methacrylate-butyl acrylate - IR-441 product, produced by MRC
(4) Additive - Heat stabilizers, lubricants, UV stabilizers, and the like Experimental Example Physical properties were measured using the specimens for measuring physical properties produced in Examples 1 to 3 and Comparative Examples 1 to 3 by evaluation methods with respect to the following items. The results are shown in Table 2 below.

Evaluation Method (1) IZOD notched impact strength (kgf/cm·cm): measured with a 6.4 mm-thick notched specimen according to ASTM D638

(2) Thermal deflection temperature (18.6 kgf, ° C.): measured with a 6.4 mm thick specimen at a load of 18.6 kgf without annealing in accordance with the method of STM D648

(3) Brightness (L*): corresponds to brightness (L) measured in accordance with the method of ASTM E308 using a specular component excluded measurement mode. With regard to blackness, as L decreases, blackness increases.

(4) Scratch resistance (gloss retention): measured using an Erichsen test method. It was evaluated using a scratcher of 0.5R at a speed of 1,000 mm/min and a load of 10N, and was expressed as gloss retention (at 60°) before and after the test. As the scratch resistance increases, the gloss retention increases. Here, gloss (at 60°) was measured in accordance with the method of ASTM D2457.

added in excess, maintained excellent brightness and scratch resistance, but had a low thermal deflection temperature.

On the other hand, the results of Table 2 showed that in Examples 1 to 3, in which respective components were mixed in optimal amounts, impact strength (kgf/cm·cm) was 4.7 to 5.4, the thermal deflection temperature (° C.) was 80 to 81, brightness (L*) was 1.54 or less, and scratch resistance was 94% or more, which means that blackness and gloss retention were improved while the thermal deflection temperature, indicating impact strength and heat resistance, was maintained.

Therefore, the thermoplastic resin composition according to the present disclosure can maintain impact resistance and heat resistance, and maximize blackness and scratch resistance by mixing a polymethyl methacrylate resin, an acrylic copolymer, and a styrene-methyl methacrylate-butyl acrylate copolymer in appropriate amounts.

As apparent from the foregoing, by mixing a polymethyl methacrylate resin, an acrylic copolymer, and a styrene-methyl methacrylate-butyl acrylate copolymer in appropriate amounts, the thermoplastic resin composition according to the present disclosure can maintain impact resistance and heat resistance, while maximizing blackness and scratch resistance.

The molded article can be injected without coating to realize appearance characteristics, and thus can reduce costs.

TABLE 2

| Physical properties | Example 1 | Example 2 | Example 3 | Comparative Example 1 | Comparative Example 2 | Comparative Example 3 |
|---|---|---|---|---|---|---|
| IZOD impact strength | 5.4 | 5.0 | 4.7 | 5.0 | 5.3 | 5.4 |
| Thermal deflection temperature (18.6 kg$_f$, ° C.) | 80 | 80 | 81 | 80 | 80 | 78 |
| Brightness (L*) | 1.54 | 1.50 | 1.47 | 1.88 | 1.71 | 1.53 |
| Scratch resistance (gloss retention) | 94% | 95% | 95% | 89% | 91% | 94% |

It can be seen from Table 2 that Comparative Example 1 not containing styrene-methyl methacrylate-butyl acrylate and Comparative Example 2 containing a small amount of styrene-methyl methacrylate-butyl acrylate exhibited low brightness and scratch resistance compared to Examples.

In addition, it can be seen that Comparative Example 3, in which styrene-methyl methacrylate-butyl acrylate was The effects of the present disclosure are not limited to those mentioned above. It should be understood that the effects of the present disclosure include all effects that can be inferred from the description of the present disclosure.

The present disclosure has been described in detail with reference to embodiments thereof. However, it will be appreciated by those skilled in the art that changes may be made in these embodiments without departing from the principles and spirit of the present disclosure, the scope of which is defined in the appended claims and their equivalents.

The invention claimed is:

1. A thermoplastic resin composition consisting of:
60% by weight to 65% by weight of a polymethyl methacrylate resin;
15% by weight to 20% by weight of an acrylic copolymer; and
15% by weight to 20% by weight of a styrene-methyl methacrylate-butyl acrylate copolymer;
wherein the acrylic copolymer has an average particle diameter of 100 nm to 300 nm;
wherein the acrylic copolymer is a copolymer prepared by grafting 50% to 60% by weight of styrene-acrylonitrile into 40% to 50% by weight of an acrylic rubber;
wherein the thermoplastic resin composition has a gloss retention of 95% or more as measured by a method where a specimen is produced by injection-molding the resin composition at 200° C. to 230° C., and then maintenance of gloss at 60° is evaluated using an Erichsen gloss meter, both before and after forming a scrape using a scraper at a load of 10N and a speed of 1,000 mm/min; and
wherein the thermoplastic resin composition has an impact strength of 4.7 to 5.0 kgf/cm·cm.

2. The thermoplastic resin composition according to claim 1, wherein the polymethyl methacrylate resin comprises one selected from the group consisting of: a methyl methacrylate homopolymer, a methyl methacrylate-acrylate copolymer, and a combination thereof.

3. The thermoplastic resin composition according to claim 1, wherein the thermoplastic resin composition has a brightness value (L*), measured according to ASTM E308 using a specular component excluded (SCE) measurement mode, of 1.54 or less.

4. A molded article comprising the thermoplastic resin composition according to claim 1.

5. A thermoplastic resin composition consisting of:
60% by weight to 65% by weight of a polymethyl methacrylate resin;
15% by weight to 20% by weight of an acrylic copolymer;
15% by weight to 20% by weight of a styrene-methyl methacrylate-butyl acrylate copolymer; and
1% to 5% by weight of an additive;
wherein the additive comprises at least one selected from the group consisting of: heat stabilizers, lubricants, UV stabilizers, lubricants, antioxidants, light stabilizers, release agents, and combinations thereof;
wherein the acrylic copolymer has an average particle diameter of 100 nm to 300 nm;
wherein the acrylic copolymer is a copolymer prepared by grafting 50% to 60% by weight of styrene-acrylonitrile into 40% to 50% by weight of an acrylic rubber;
wherein the thermoplastic resin composition has a gloss retention of 95% or more as measured by a method where a specimen is produced by injection-molding the resin composition at 200° C. to 230° C., and then maintenance of gloss at 60° is evaluated using an Erichsen gloss meter, both before and after forming a scrape using a scraper at a load of 10N and a speed of 1,000 mm/min; and
wherein the thermoplastic resin composition has an impact strength of 4.7 to 5.0 kgf/cm·cm.

6. The thermoplastic resin composition according to claim 5, wherein the polymethyl methacrylate resin comprises one selected from the group consisting of: a methyl methacrylate homopolymer, a methyl methacrylate-acrylate copolymer, and a combination thereof.

7. The thermoplastic resin composition according to claim 5, wherein the thermoplastic resin composition has a brightness value (L*), measured according to ASTM E308 using a specular component excluded (SCE) measurement mode, of 1.54 or less.

8. A molded article comprising the thermoplastic resin composition according to claim 5.

* * * * *